United States Patent
Lidman et al.

(10) Patent No.: US 7,089,880 B2
(45) Date of Patent: Aug. 15, 2006

(54) COOLING MILK IN AN AUTOMATIC MILKING SYSTEM

(75) Inventors: Magnus Lidman, Rönninge (SE); Staffan Persson, Tumba (SE)

(73) Assignee: Delaval Holding AB, Tumba (SE)

( * ) Notice: Subject to any disclaimer, the term of this patent is extended or adjusted under 35 U.S.C. 154(b) by 47 days.

(21) Appl. No.: 10/471,172

(22) PCT Filed: Mar. 19, 2002

(86) PCT No.: PCT/SE02/00522

§ 371 (c)(1), (2), (4) Date: Mar. 1, 2004

(87) PCT Pub. No.: WO02/074069

PCT Pub. Date: Sep. 26, 2002

(65) Prior Publication Data

Related U.S. Application Data

(63) Continuation-in-part of application No. 10/183,000, filed as application No. PCT/SE01/00192 on Feb. 1, 2001, now Pat. No. 6,782,705.

(30) Foreign Application Priority Data

Feb. 4, 2000 (SE) .................................. 0000362-4
Mar. 20, 2001 (SE) .................................. 0100970-3

(51) Int. Cl.
*A01J 5/007* (2006.01)
(52) U.S. Cl. .................................. 119/14.08; 119/14.09
(58) Field of Classification Search ............ 119/14.02, 119/14.08, 14.09, 14.17
See application file for complete search history.

(56) References Cited

U.S. PATENT DOCUMENTS

| | | | | |
|---|---|---|---|---|
| 2,509,214 A | * | 5/1950 | Cordis | 119/14.09 |
| RE23,543 E | * | 9/1952 | Duncan | 119/14.09 |
| 4,612,537 A | * | 9/1986 | Maltais et al. | 340/596 |
| 5,275,124 A | * | 1/1994 | van der Lely et al. | 119/14.08 |
| 5,769,025 A | | 6/1998 | van der Lely et al. | 119/14.42 |

FOREIGN PATENT DOCUMENTS

| | | |
|---|---|---|
| EP | 0471598 | 2/1992 |
| EP | 0797915 | 10/1997 |
| WO | 0156370 | 8/2001 |

* cited by examiner

*Primary Examiner*—Robert P. Swiatek
(74) *Attorney, Agent, or Firm*—Harness, Dickey & Pierce, P.L.C.

(57) ABSTRACT

Example embodiments of the present invention relate to methods and arrangements for cooling milk in a milk storage tank of an automatic milking system comprising (i) measuring an amount of extracted milk by a milk flow meter; (ii) determining a cooling need for milk stored or to be stored in the milk storage tank based on the amount of milk; (iii) measuring a quantity indicative of a temperature of an inner surface area of a bottom portion of the milk storage tank; and cooling the bottom portion of the milk storage tank in consecutive periods, such that each period of cooling ($\tau 1$, $\tau 3$) is followed by a respective period of non-cooling ($\tau 2$, $\tau 4$), wherein the duration of each period of cooling and/or non-cooling is based on the measured quantity indicative of the inner surface area temperature, and the cooling need.

23 Claims, 2 Drawing Sheets

COOLING MILK IN AN AUTOMATIC MILKING SYSTEM

FIELD OF INVENTION

This application is a continuation-in-part of application Ser. No. 10/183,000, filed Nov. 25, 2002 (now U.S. Pat. No. 6,782,705), which is the National Stage of International Application No. PCT/SE01/00192, filed Feb. 1, 2001.

The present invention relates generally to dairy farming and particularly to a method and an arrangement, respectively, for cooling of milk in an automatic milking system.

BACKGROUND

In dairy farming animals are milked and their milk is thereafter stored in a milk storage tank for collection on a regular time basis, e.g. every second day. In order to maintain the quality of the milk, it is cooled to approximately 4° C. as quickly as possible. It is necessary to be careful during cooling of the milk since the quality is deteriorated if the milk freezes.

At a dairy farm provided with an automatic milking system, the milk usually enters the milk storage tank in small amounts spread during the day and night, compared to a dairy farm without an automatic milking system, where all animals are milked together two or three times a day. The milk storage tank is usually equipped with a cooling device, which lowers the temperature of the milk to about 4° C. and maintains this temperature in a filled milk storage tank. When the milk storage tank only contains small amounts of milk, there is a considerable risk of cooling the milk too much since the cooling device, when cooling, operates at full capacity.

Usually the cooling of milk in a milk storage tank is controlled in response to the temperature of the milk in the tank. The milk temperature is usually measured on the outside of the tank due to hygienic requirements, and this results in a rather slow response when the temperature of the milk within the tank is changed. Such a sluggish temperature response gives rise to problems, in particular when the volume of stored milk is small. The temperature of a small milk volume is lowered rapidly at the risk of freezing the milk.

Furthermore, the milk storage tank is typically provided with a stirrer, which stirs the milk in the tank to obtain a uniform temperature of the milk. Such a stirrer is usually not able to stir the milk in the tank when the tank contains only small amounts of milk, which thus involves a further risk of freezing milk locally at the beginning of the filling of the tank with milk. If cooling, on the other hand, is omitted while there is only a small volume of milk in the milk storage tank, this milk is not cooled at once, and thus the quality of the milk is deteriorated.

SUMMARY OF THE INVENTION

An object of the present invention is to provide a method and an arrangement, respectively for cooling milk rapidly in an automatic milking system without risk of freezing the milk, particularly when only small amounts of milk are present in the milk storage tank.

This object, among others, is attained by methods and arrangements, respectively, as claimed in the appended patent claims.

By cooling in consecutive periods according to the present invention, milk is cooled without risk of being frozen, and thus a high milk quality can be safeguarded.

In accordance with one preferred embodiment of the present invention the milk storage tank itself is pre-cooled, i.e. cooled before milk is entered therein. In such manner, milk transported to the milk storage tank can be cooled faster, and thus an enhanced milk quality is obtained.

In accordance with another preferred embodiment of the present invention the cooling of milk may be performed firstly, when there is only a small volume of milk in the milk storage tank, as set out in the independent claims, and then, when a level of milk in said milk storage tank exceeds a threshold level, the cooling is controlled in response to the temperature of the milk in a conventional fashion.

Further features and advantages of the present invention will be evident from the following description.

BRIEF DESCRIPTION OF THE DRAWINGS

The present invention will become better understood from the detailed description of embodiments given below and the accompanying FIGS. 1–3, which are given by way of illustration only, and thus, are not limitative of the present invention, wherein.

DETAILED DESCRIPTION OF EMBODIMENTS

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details.

Figure 1:
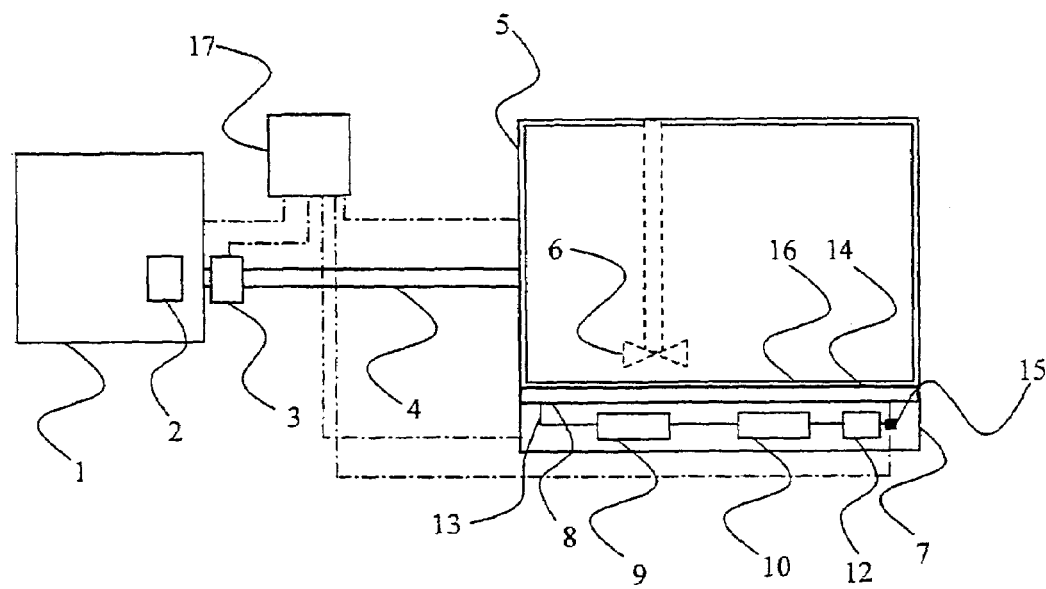
FIG. 1 is a schematic representation of an automatic milking system including a milk cooling arrangement according to a preferred embodiment of the present invention.

An automatic milking system, as shown in FIG. 1, comprises a milking robot 1 for milking animals, such as cows, including a milk flow meter 2 for measuring the milk flow during milking; a milk storage tank 5 which stores milk for collection on a regular time basis; a milk line 4 connecting the milking robot 1 with the milk storage tank 5; a milk pump (not shown) for pumping milk from the milking robot 1 to the milk storage tank 5; and a pre-cooling device 3 for cooling milk, which is pumped over to the milk storage tank 5.

The milk storage tank 5 is provided with a stirrer 6 for stirring milk in the milk storage tank 5; and a cooling device 7 for cooling milk in the milk storage tank 5.

The cooling device 7 includes typically an evaporator 8; a compressor 9; a condenser 10; and an expansion valve 12, all of which being interconnected by a connecting piping 13, such that a cooling medium can be circulated therein. The evaporator is suitably integrated in, or in contact with, a bottom portion 14 of the wall of the milk storage tank 5 and the compressor 9 is typically driven by an electrical motor (not shown).

Furthermore, the cooling device 7 comprises a sensor 15 for sensing a quantity, which is indicative of a temperature of an inner surface area 16 of the bottom portion 14 of the milk storage tank 5.

The sensor is preferably a temperature sensor 15 for measuring the temperature of the connecting piping 13 between the expansion valve 12 and the evaporator 8 of the cooling device 7.

Alternatively, the temperature sensor 15 may be arranged to measure the temperature of the expansion valve 12, or of the evaporator 8.

As a further alternative, the sensor may be a pressure sensor (not illustrated) for sensing the pressure in the evaporator 8 or preferably in the connecting piping 13 downstream from the evaporator 8. However, a temperature sensor is preferred since it is easier to arrange a temperature sensor 15 at the outside of the connecting piping 13, the expansion valve 12, or the evaporator 8 than to introduce a pressure sensor within the connecting piping 13.

The milking system further comprises a controller 17, such as a microcomputer provided with suitable software, for controlling and managing the milking robot 1, including keeping records of animals to be milked and their respective characteristics, such as milk quality, amount of milk per milking, and time lapsed since last milking. Further, the controller 17 is adapted for controlling the cooling device 7, which includes receiving measured values from the milk flow meter 2 and the sensor 15.

Alternatively, one controller is provided for the control of the milking robot and another separate controller is provided for the control of the cooling device (not illustrated), in which case the two controllers are connected with each other to provide for one-way or two-way communication between them.

The milk flow in the milking system is measured by the milk flow meter 2 and may be registered by the controller 17 to obtain an accumulated milk flow and optionally to determine the level of milk in the milk storage tank 5 by prior knowledge of the design of the milk storage tank and the obtained accumulated milk flow.

Alternatively, the level of milk in the milk storage tank may be measured by means of a level-measuring device (not illustrated) located in the milk storage tank 5.

As a further alternative, the level of milk in the milk storage tank can be determined by measuring a static pressure or change in static pressure of the milk at the bottom of the milk storage tank 5, e.g. detected by a sensor (not illustrated) at the bottom of the milk storage tank.

Instead of measuring the milk flow in the robot 1 it would be possible to provide a milk flow meter (not illustrated) in the milk line 4, e.g. adjacent to the milk storage tank 5, to measure the milk flow there.

The cooling of the cooling device 7 is controlled, in accordance with the present invention, by operating the cooling device 7 in periods of cooling, each of which being followed by a respective period of non-cooling, where the duration of each period of cooling and/or non-cooling is determined and controlled by the controller 17. More precisely, the controller 17 is adapted to receive a value of the flow of milk from the milk flow meter 2; to determine, i.e. calculate, a cooling need for milk to be stored in said milk storage tank based on the received value of the flow of milk; and to receive a value of the quantity sensed by the sensor 15. The duration of each period of cooling and/or period of non-cooling is then controlled based on the determined cooling need and the value of the quantity sensed by sensor 15.

It is particularly important to control the cooling such that the temperature of the inner surface area 16 of the bottom portion 14 of the milk storage tank 5 does not fall below 0° C.

By such an approach the cooling of milk in the milk storage tank may be started when only small amounts of milk have been stored therein, and a quick cooling of the first amounts of stored milk is obtained without any risk of freezing the same.

Figure 2:
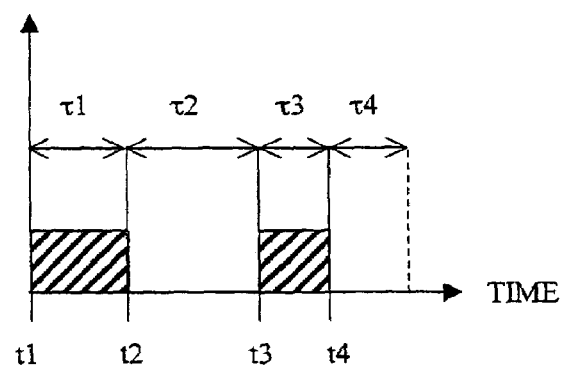
FIG. 2 is an exemplary diagram illustrating the cooling of the inventive milk cooling arrangement of FIG. 1 as a function of time.

In FIG. 2 is shown a diagram illustrating an example of a the cooling by the cooling device 7 as a function of time, wherein two periods of cooling $\tau 1$ and $\tau 3$ and two periods of non-cooling $\tau 2$ and $\tau 4$ are shown. The duration of two periods of cooling and two periods of non-cooling, at four different times are illustrated in FIG. 2.

Such a cooling may occur as a result of the following exemplary scenario. At t1 a sensor, e.g. the milk flow meter 2, indicates an increased milk flow to the controller, which calculates a new increased cooling need and in response thereto the controller starts the cooling. At t2 the temperature sensor 15 indicates a low temperature, e.g. close to 0° C., and in response thereto the controller stops the cooling. At t3 the temperature sensor 15 indicates a higher temperature and in response thereto the controller starts the cooling again. Then, at t4 the temperature sensor 15 indicates a low temperature and in response thereto the controller stops the cooling.

The cooling need of the milking system depends on the amount of milk to be stored in the milk storage tank 5, which in turn is determined by the flow of milk in the milking system. The cooling by the cooling device 7, which is required for cooling a specific volume of milk, is divided into periods of cooling and non-cooling to avoid freezing of the milk, and these periods are continued until the cooling need is fulfilled as indicated by the milk flow meter 2 and/or the sensor 15.

The accumulated milk flow may be utilized to calculate how much of a heat transfer area, i.e. the area where the cooling device efficiently draws heat from the milk storage tank, in the milk storage tank that is covered by milk. If the milk does not cover the whole heat transfer area, the risk of freezing the milk is particularly large, which may be taken into account by the controller 17 when determining the duration of the periods of cooling and/or the periods of non-cooling.

The cooling need further depends on the design of the milk storage tank 5, and of the temperature surrounding the milk storage tank 5. The influence of the surrounding temperature will be less if the milk storage tank is insulated. Such insulation is usually implemented as a layer of insulation material between the wall of the milk storage tank and an outer shell.

If the cooling device 7 has a minimum period of rest due to the electrical motor of the cooling device having a need to be cool down after a period of cooling, or else the motor might be damaged, such a minimum period of rest defines a minimum duration of a period of non-cooling as controlled by the controller 17.

The flow pattern of milk in the milk storage tank 5, i.e. the flow pattern of the milk obtained by inflowing milk and/or obtained by an auxiliary device, such as the stirrer 6, affects how fast temperature differences of milk in different parts of the milk storage tank are evened out, which might be a factor to consider by the controller 17. A flow pattern obtained by the stirrer 6 has only to be considered when the milk level in milk storage tank has reached the lowermost portion of the stirrer such that stirring really takes place.

Furthermore, there are a number of more operation conditions, which, more or less, may affect the cooling need, the cooling capacity, or which may be utilized to correct the cooling as performed by the cooling device 7 and controlled by the controller 17.

The cooling may be controlled based on the time lapsed since the cooling device 7 ended a period of cooling, the temperature of the milk in the milk storage tank 5, and the amount of the milk in the milk storage tank 5. If the controller 17 takes these dependencies into account when determining the lengths of the periods of cooling and non-cooling, a better cooling control may be obtained.

In some designs of a milking system the first amounts of milk pumped from the milking robot after cleaning the tank may not reach the milk storage tank until several cows have been milked, due to that the milk only fills the inner volume of the milk line 4. This affects also the cooling need and accordingly the controller 17 may take this into account when controlling the operation of the cooling device 7.

The controller may be arranged to initiate a period of cooling when the milk pump of the milking system, at the milking robot, is started, and to control the cooling device based on the number of times the milk pump at the milking robot has been started during a predetermined period of time.

Alternatively, or as complement, the controller 17 may be adapted to control the cooling of the cooling device based on the number of animals that have been milked during the predetermined period of time.

As the control device 8 keeps record of the cows being milked and identifies each cow prior to milking, such identification may affect the control of the cooling device 7 since a period of cooling may begin earlier or last longer if the cow identified prior to milking is known to have a high milk yield.

The efficiency of a cooling process using e.g. an air-cooled condenser may change significantly if the temperature surrounding the condenser changes, e.g. depending on the time of year or between daytime and nighttime. That is, a certain amount of electrical effect fed into the cooling device results in one level of cooling during daytime and another level of cooling during nighttime. Such environment-dependent cooling capacity could be compensated for by the controller if a temperature sensor is provided for detection of the temperature close to the condenser and using a correction factor depending on this temperature for adjusting the cooling. Alternatively, a timer may be used to adjust the correction factor if the temperature variations during the day and night are predictable.

Further, if the pre-cooling device is a heat exchanger, e.g. a plate heat exchanger, it may not be capable to pre-cool a large flow of milk as efficient as a lower flow of milk and thus a larger flow of milk will be warmer when reaching the milk storage tank 5. Thus, the controller 17 preferably takes into account the efficiency of the pre-cooling device 3 by means of prior knowledge of its cooling capacity or by means of measuring the temperature of the milk in milk line 4.

In a particular embodiment of the present invention the milk storage tank itself is pre-cooled, i.e. cooled before milk is entered therein. Preferably, the controller initiates a period of cooling of the milk storage tank 5 itself directly after the cleaning of the same is finished. In such manner, milk transported to the milk storage tank can be cooled faster, and thus an enhanced milk quality can be obtained.

Figure 3:
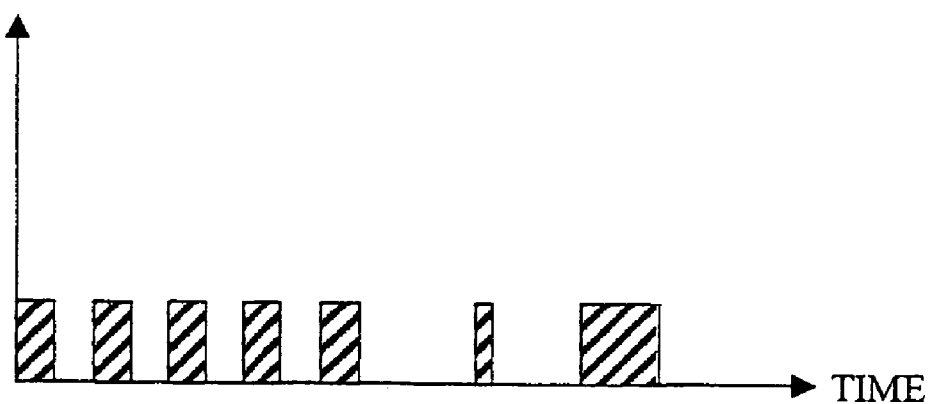
FIG. 3 is another exemplary diagram illustrating the cooling of the inventive milk cooling arrangement of FIG. 1 as a function of time.

FIG. 3 illustrates a diagram indicating periods of cooling followed by periods of non-cooling during such pre-cooling of the milk storage tank 5 itself. Firstly five periods of cooling lower the temperature of the milk storage tank to approximately 4° C. by cooling the heat transfer area during each period of cooling to approximately 0° C. During the periods of non-cooling the temperature differences in the milk storage tank wall is equalized. The sixth cooling period illustrates the cooling need of a small amount of milk entering, or about to enter, the milk storage tank. The seventh cooling period illustrates the cooling need of a large amount or several consecutive small amounts of milk entering, or about to enter, the milk storage tank.

Next an example of cooling of a 3500-liter milk storage tank having a wall made of 300 kg stainless steel will be described.

Subsequent to cleaning, the tank has a temperature of about 20° C. and then 2400 kJ of cooling capacity is needed to bring the tank temperature down to 4° C. according to the formula $E=cm\Delta t$, where c is the heat capacity, m is the mass of the tank and $\Delta t$ is the temperature drop caused by cooling (c=500 J/kg° C. for stainless steel, m=300 kg, and $\Delta t=16°$ C.). Any heat losses to the air surrounding the tank are assumed to be negligible in this calculation.

Such a milk storage tank contains about 4 kg of air, which needs 65 kJ of cooling capacity to bring the air temperature down to 4° C., since $c_p=1000$ J/kg° C. for air. Further, 0.06 kg of moisture in the air will be reduced to 0.03 kg during the cooling process, which consumes 74 kJ of condensation energy.

Thus, it can be seen that the cooling need of the tank in this case is 2539 kJ. A 3 kW cooling compressor having a cooling factor of $\epsilon=2.4$ needs a running time of about six minutes to produce the cooling capacity needed to bring the temperature of the milk storage tank down to 4° C. (according to running time $\tau=E/P\epsilon$, where the energy E is 2539 kJ, the power P is 3 kW, and the cooling factor $\epsilon$ is 2.4).

Since the heat transfer between the bottom wall of the empty milk storage tank and the side walls thereof takes place during a period of time, it may be advisable to start the cooling compressor subsequent to the cleaning and let it run for two minutes to get an initial lowering of the temperature at the bottom of the tank. Thereafter a period of rest of about two minutes is used (which may be given by the temperature sensed by sensor 15) to equalize the temperature in the tank. Two minutes running period and two minutes rest period can then be repeated (given by the temperature sensed by sensor 15) until a complete running time of the six minutes is achieved.

Milk leaving a cow has a temperature of about 37° C., but may have been reduced to about 35° C. during transport to the milk storage tank. An amount of 15 l of milk needs an effective compressor running time of about 270 s, as m≈15 kg, $\Delta t=31°$ C., c=4190 J/kg° C. for milk, P=3000 W, and $\epsilon=2.4$.

As the milk from the first cow only covers a part of the cooling surface in the milk storage tank, the cooling device is run in sequences of about one minute followed by a rest period of two minutes (which may be given by the temperature sensed by sensor 15), to avoid freezing the milk. The controller keeps track of the accumulated milk flow as more cows are being milked and increases the running time when the volume of milk in the tank increases, e.g. to two minutes running time.

It shall be appreciated that the duration of each of the periods of cooling and non-cooling is determined according to an algorithm, which uses at least the determined cooling need and the quantity sensed as inputs. Further inputs may be employed to obtain a refined cooling process. It shall particularly be noted that the duration of each period of non-cooling may not only be determined in response to the quantity sensed, but other measured values or prior knowledge may be used such as e.g. an estimated average number of cows to be milked per time unit.

In yet a particular embodiment of the present invention the cooling of milk may be performed firstly, when there is only a small volume of milk in the milk storage tank 5, as described with reference to the first embodiment of the invention, and then, when a level of milk in said milk storage tank exceeds a threshold level, the cooling is controlled in a conventional fashion, i.e. in response to a temperature of milk in the milk storage tank 5. The threshold value is preferably determined to be a level, which is sufficiently high so the stirrer 6 can effectively stir the milk in the milk storage tank 5 and even out any temperature gradients in the milk. Thus the risk of freezing the milk is very low.

In still a particular embodiment of the present invention the controller 17 may use a feedback process for adjusting the periods of cooling and/or periods of non-cooling. Thus, if a temperature of the milk at the end of a cooling process (e.g. a cooling process, which ends when the milk in the milk storage tank 5 is collected, or alternatively when the milk level in the milk storage tank exceeds the above-mentioned threshold value) is detected to be different than expected (e.g. different than an end temperature used in the calculation of the cooling need), the controller may adjust the cooling capacity of the cooling device 7 accordingly for a following cooling process. Such an adjustment may be made by introducing a correction factor to correct for the discrepancy between the detected and the expected temperatures.

The present invention being thus described, it will be obvious that the same may be varied in a plurality of ways. All such variations as would be obvious for a person skilled in the art are intended to be included within the scope of the present invention.

The invention claimed is:

1. A method for cooling milk in an automatic milking system, which comprises a milking robot for milking animals, such as cows; a milk storage tank connected to said milking robot for storing milk extracted by the milking robot; and a cooling device for cooling milk stored or to be stored in said milk storage tank by cooling a bottom portion of said milk storage tank, said method comprising the steps of:
   measuring an amount of milk extracted by said milking robot by a milk flow meter;
   determining a cooling need for milk stored or to be stored in said milk storage tank based on said measured amount of milk;
   measuring a quantity indicative of a temperature of an inner surface area of the bottom portion of the milk storage tank; and
   cooling said bottom portion of said milk storage tank in consecutive periods, such that each period of cooling is followed by a respective period of non-cooling, wherein the duration of each period of cooling and/or non-cooling is based on said measured quantity indicative of the inner surface temperature, and said determined cooling need.

2. The method as claimed in claim 1 wherein at least one period of cooling is started while said milk storage tank is empty of milk.

3. The method as claimed in claim 1 wherein the steps of measuring an amount of milk; determining a cooling need; measuring a quantity indicative of a temperature of an inner surface area of the bottom portion of the milk storage tank; and cooling said bottom portion of said milk storage tank in consecutive periods are preceded by the step of cooling said milk storage tank by cooling the bottom portion thereof.

4. The method as claimed in claim 3 wherein the step of cooling said milk storage tank by cooling the bottom portion thereof is performed after cleaning of said milk storage tank.

5. The method as claimed in claim 1 wherein at least one period of cooling is started while milk from at most five animals has been stored in said milk storage tank.

6. The method as claimed in claim 1 wherein said quantity indicative of a temperature of an inner surface area of the bottom portion of the milk storage tank is a temperature of the cooling device.

7. The method as claimed in claim 6 wherein
   said cooling device includes an evaporator; a compressor; a condenser; and an expansion valve, all of which being interconnected by a connecting piping, such that a cooling medium can be circulated therein; and wherein
   said quantity indicative of a temperature of an inner surface area of the bottom portion of the milk storage tank is a temperature of the connecting piping between the expansion valve and the evaporator, of the expansion valve or of the evaporator.

8. The method as claimed in claim 1 wherein
   said cooling device includes an evaporator; a compressor; a condenser; and an expansion valve, all of which being interconnected by a connecting piping, such that a cooling medium can be circulated therein; and wherein
   said quantity indicative of a temperature of an inner surface area of the bottom portion of the milk storage tank is a pressure in said evaporator or in the connecting piping between the evaporator and the compressor.

9. The method as claimed in claim 1 wherein said step of cooling said milk storage tank is performed while ensuring that the temperature of said inner surface area of the bottom portion of the milk storage tank is kept above 0° C.

10. The method as claimed in claim 1 wherein said amount of milk is measured in said milking robot.

11. The method as claimed in claim 1 wherein said amount of milk is measured in or at said milk storage tank.

12. The method as claimed in claim 1 comprising the step of cooling said bottom portion of said milk storage tank in response to a temperature of milk stored in said milk storage tank if a level of milk in said milk storage tank exceeds a threshold level.

13. The method as claimed in claim 1 wherein
   the step of determining a cooling need for milk stored or to be stored in said milk storage tank includes the establishment of an expected temperature of the milk stored or to be stored in the milk storage tank at the end of the step of cooling said bottom portion of said milk storage tank in consecutive periods;
   the temperature of the milk is established at the end of the step of cooling said bottom portion of said milk storage tank in consecutive periods; and
   the method for cooling milk is repeated, wherein the duration of each period of cooling and/or non-cooling is based also on any difference between said expected and established temperatures.

14. An arrangement for cooling milk in an automatic milking system, said milking system comprising a milking robot for milking animals, such as cows; a milk flow meter for measuring an amount of milk extracted by said milking robot; a milk storage tank connected to the milking robot for storing milk extracted by the milking robot; and a cooling device for cooling milk stored or to be stored in said milk storage tank by cooling a bottom portion of said milk storage tank, wherein said arrangement comprises:

a sensor for measuring a quantity indicative of a temperature of an inner surface area of the bottom portion of the milk storage tank; and a controller for determining a cooling need for milk stored or to be stored in said milk storage tank based on said measured amount of milk; and for controlling said cooling device to cool said bottom portion of said milk storage tank in consecutive periods, such that each period of cooling is followed by a respective period of non-cooling, wherein the duration of each period of cooling and/or non-cooling is based on said measured quantity indicative of the inner surface area temperature, and said determined cooling need.

15. The arrangement as claimed in claim 14 wherein the controller is adapted to control said cooling device to start at least one period of cooling while said milk storage tank is empty of milk.

16. The arrangement as claimed in claim 14 wherein the controller is adapted to control said cooling device to start at least one period of cooling while milk from at most five animals has been stored in said milk storage tank.

17. The arrangement as claimed in claim 14 wherein said quantity indicative of a temperature of an inner surface area of the bottom portion of the milk storage tank is a temperature of the cooling device.

18. The arrangement as claimed in claim 17 wherein said cooling device includes an evaporator; a compressor; a condenser; and an expansion valve, all of which being interconnected by a connecting piping, such that a cooling medium can be circulated therein; and wherein said sensor for measuring the quantity indicative of a temperature of an inner surface area of the bottom portion of the milk storage tank is a temperature sensor arranged at the connecting piping between the expansion valve and the evaporator, at the expansion valve or at the evaporator.

19. The arrangement as claimed in claim 14 wherein said cooling device includes an evaporator; a compressor; a condenser; and an expansion valve, all of which being interconnected by a connecting piping, such that a cooling medium can be circulated therein; and wherein said sensor for measuring said quantity indicative of a temperature of an inner surface area of the bottom portion of the milk storage tank is a pressure sensor arranged to measure the pressure in said evaporator, or in the connecting piping between the evaporator and the compressor.

20. The arrangement as claimed in claim 14 wherein said controller is adapted to control said cooling device to cool said milk storage tank while ensuring that the temperature of said inner surface area of the bottom portion of the milk storage tank is kept above 0° C.

21. The arrangement as claimed in claim 14 wherein said milk flow meter for measuring said amount of milk extracted by said milking robot is arranged in said milking robot.

22. The arrangement as claimed in claim 14 wherein said milk flow meter for measuring said amount of milk extracted by said milking robot is arranged in or at said milk storage tank.

23. The arrangement as claimed in claim 14 wherein the controller is adapted to control said cooling device to cool said bottom portion of said milk storage tank in response to a temperature of milk stored in said milk storage tank depending on a level of milk in said milk storage tank exceeding a threshold level.

* * * * *